(12) United States Patent
Kreckel et al.

(10) Patent No.: US 7,062,024 B2
(45) Date of Patent: Jun. 13, 2006

(54) TELECOMMUNICATION SERVICES REPORTING SYSTEM

(75) Inventors: Richard D. Kreckel, Franklin, WI (US); Raymond P. Watson, Livermore, CA (US)

(73) Assignee: Ameritech Communications, Inc., Rosemont, IL (US)

( * ) Notice: Subject to any disclaimer, the term of this patent is extended or adjusted under 35 U.S.C. 154(b) by 406 days.

(21) Appl. No.: 10/024,847

(22) Filed: Dec. 19, 2001

(65) Prior Publication Data

US 2003/0112937 A1    Jun. 19, 2003

(51) Int. Cl.
*H04M 15/00* (2006.01)

(52) U.S. Cl. .............. 379/126; 379/115.01; 379/121.05

(58) Field of Classification Search ................ 379/126, 379/112.07, 112.01, 114.01, 114.15, 114.19, 379/115.01, 121.05
See application file for complete search history.

(56) References Cited

U.S. PATENT DOCUMENTS

| | | | | |
|---|---|---|---|---|
| 5,325,290 A | * | 6/1994 | Cauffman et al. ............ | 705/34 |
| 5,680,611 A | * | 10/1997 | Rail et al. .................... | 707/101 |
| 5,999,604 A | * | 12/1999 | Walter ......................... | 379/133 |
| 6,052,448 A | * | 4/2000 | Janning .................. | 379/115.01 |
| 6,072,493 A | * | 6/2000 | Driskell et al. ............. | 715/854 |
| 6,356,628 B1 | * | 3/2002 | Burke et al. ........... | 379/112.06 |

* cited by examiner

*Primary Examiner*—Barry Taylor
(74) *Attorney, Agent, or Firm*—Toler Schaffer, LLP

(57) ABSTRACT

A system and method for processing a plurality of call detail records (CDR) each indicative of a call transaction on a telecommunications network. The method includes receiving the plurality of CDRs at a first controller, wherein each of the CDRs include a data structure including a plurality of fields each containing at least one character. The method then selects a first sorting field from the plurality of fields and groups the plurality of CDRs as a function of data within the first sorting field. In one embodiment, the first sorting field is used to group the CDRs according to different carriers. The method then analyzes at least one additional sorting field within each of the CDRs which were previously grouped according to the first sorting field. A report is then generated for each of the grouped CDRs as a function of data within the additional sorting field. In this way, periodic, customized reports can be generated from information contained with CDRs with user-selectable sorting or analysis fields.

19 Claims, 4 Drawing Sheets

Date – Houston Cluster

↙ 100

↙ 102

| Originating Trunk Groups | Total Members Available | Total Attempts | Successful Attempts | Incomplete Attempts | Average VRU Time |
|---|---|---|---|---|---|
| WCG – Houston | | | | | |
| WCG – Kansas City | | | | | |
| WCG – Boston | | | | | |
| WCG – Newark | | | | | |
| WCG – Atlanta | | | | | |
| WCG – Broadview | | | | | |

↙ 104

| Terminating Trunk Groups | Total Members Available | Total Attempts | Successful Attempts | Incomplete Attempts | Average VRU Time |
|---|---|---|---|---|---|
| WCG – Houston | | | | | |
| WCG – Kansas City | | | | | |
| WCG – Boston | | | | | |
| WCG – Newark | | | | | |
| WCG – Atlanta | | | | | |
| WCG – Broadview | | | | | |

FIG. 5

TELECOMMUNICATION SERVICES REPORTING SYSTEM

TECHNICAL FIELD

The present invention relates to telecommunication networks, and in particular, to systems and methods for generating network usage reports from call detail record files.

BACKGROUND ART

The deregulation of the telecommunications industry has resulted in an environment where subscribers are given many choices of telecommunications service providers. Each service provider typically offers different rate plans that govern the cost the subscriber pays for various voice and data transmissions. In addition, the network over which the telecommunication services are provided, may be only partially owned or leased by the subscriber's particular service provider. To keep track of subscriber billing or network usage and communication services, service providers rely upon records created for each subscriber transaction on the network. For example, a call detail record (CDR) is generated when a telephone call is placed by a subscriber across the network. Groups of CDRs are stored in files of various formats and sizes for periodic retrieval and processing by a computer-based billing system.

For example, a CDR is created when a subscriber uses a calling card to place a telephone call. An example of a platform for processing such calling card accounts is the InterVoice Brite system used by SBC Telecommunications. The calling card system creates CDRs which are available for downstream processing systems to provide billing for network time or create customer billing records for network usage or generate network usage reports for the service provider. In a typical busy hour such systems can create files containing more than 5,000 CDRs. Currently, the available reporting functions from the calling card platform are limited. Accordingly, there exists a need for an improved reporting system to manage customer accounts and provide network auditing and statistical measures for service provider analysis and business planning. The present invention is directed towards these ends.

BRIEF DESCRIPTION OF THE DRAWINGS

The invention is pointed out with particularity in the appended claims. However, other features of the invention will become apparent and the invention will be best understood by referring to the detailed description in conjunction with the accompanying drawings in which:

FIG. 5 shows one example of a report generated in accordance with the method of FIG. 4.

DETAILED DESCRIPTION OF THE INVENTION

The various embodiments of the present invention are advantageous for reporting on system usage. In one embodiment, a method for processing transaction records indicative of subscriber activity on a telecommunication network is provided. Each transaction record represents a CDR. The method includes processing a plurality of call detail records (CDRs) each indicative of a call transaction on a telecommunications network. The method includes receiving the plurality of CDRs at a first controller, wherein each of the CDRs include a data structure including a plurality of fields containing at least one character. The method then selects a first sorting field from the plurality of fields and groups the plurality of CDRs as a function of data within the first sorting field. In one embodiment, the first sorting field is used to group the CDRs according to different carriers. The method then analyzes at least one additional sorting field within each of the CDRs which were previously grouped according to the first sorting field. A report is then generated for each of the grouped CDRs as a function of data within the additional sorting field. In this way, periodic, customized reports can be generated from information contained with CDRs with user-selectable sorting or analysis fields. Additionally, the analysis can occur remote from the system server which generates the CDRs.

In another embodiment, a system for processing CDRs is provided. The system includes a system cluster in operative communication with a telecommunications network. The cluster generates a plurality of CDRs which are each indicative of a call transaction on the telecommunications network. A production database server periodically receives and stores the CDRs from the system cluster. A user access server is also provided in operative communication with the production database server. The user access server is programmed to select a first sorting field from a plurality of fields within each CDR and group the plurality of CDRs as a function of data within the first sorting field. Again, the carrier identification code (CIC) can be the first sorting field to group CDRs common to each carrier. The user access server is further programmed to analyze at least a second sorting field within each of the grouped CDRs, and generate a report for each of the grouped CDRs as a function of data within the second sorting field. The sorting fields are user-selectable.

In the following examples, the method and system are described with respect to a long distance calling card platform and the CDRs generated thereby. This is but one example, of many, in which the present invention may be advantageously used. Such other systems are contemplated by the present invention.

Figure 1:
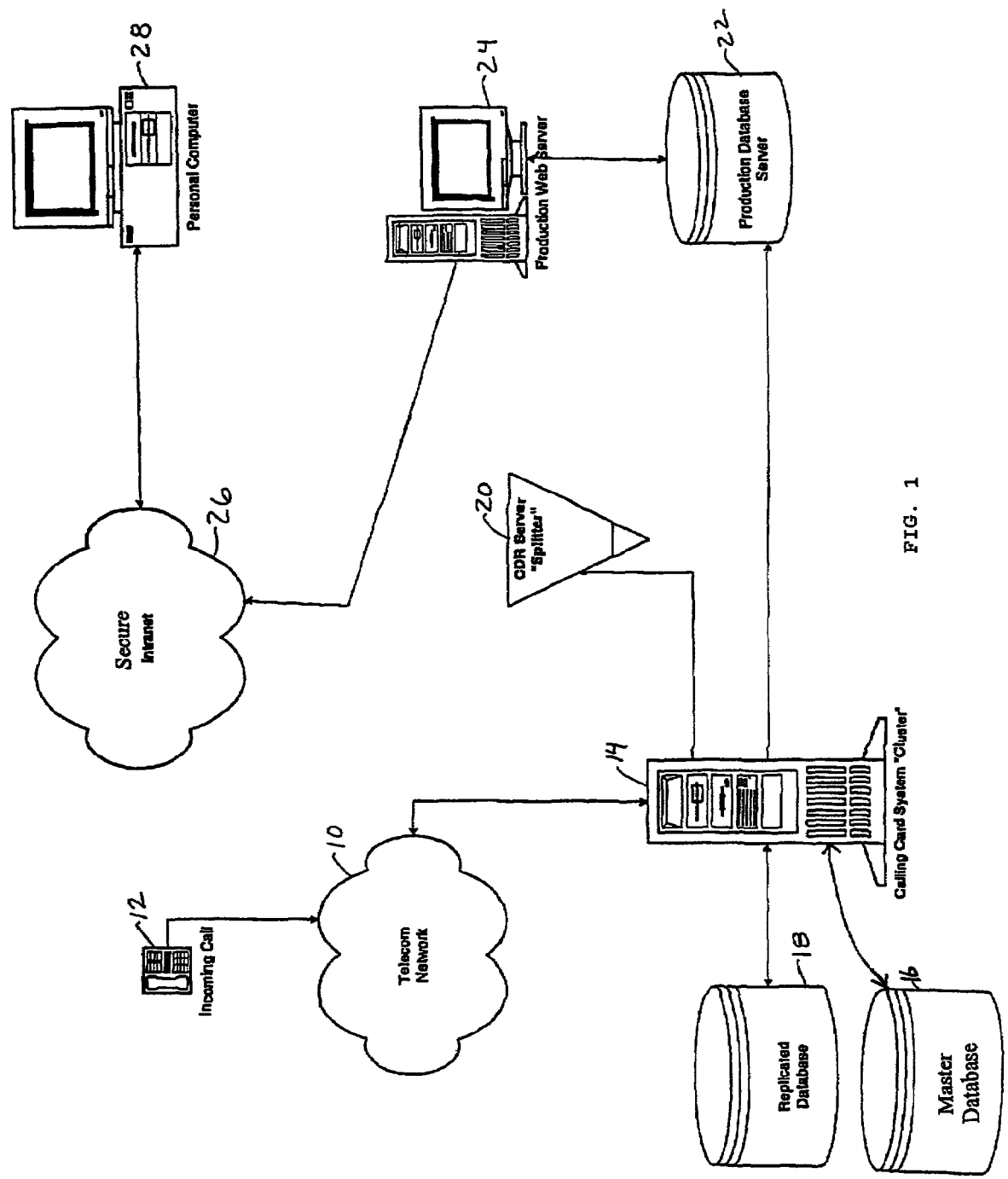
FIG. 1 is a schematic block diagram of a telecommunication system in which the present invention may be used to advantage.

Referring now to FIG. 1, there is shown a schematic block diagram of a telecommunication system in which the present invention may be used to advantage. In FIG. 1, a telecommunications network 10 representing, for example, the public switched telephone network (PSTN) is disclosed which provides telecommunication services to a plurality of network subscribers 12 having a respective customer premises equipment. The telecommunications network 10 provides a variety of voice and data services for each of the subscribers 12 or groups of subscribers. For example, the telecommunications network 10 can provide plain old telephone service (POTS) as well as enhanced services such as call waiting, caller identification, call forwarding, three-way conferencing, etc. In the example shown in FIG. 1, telecommunications network 10 provides calling card functionality as part of its enhanced network services. Accordingly, telephone calls placed by way of calling cards are processed by a calling card system cluster, one of which is represented by controller 14. However, the calling card network portion of telecommunications network 10 may include multiple clusters 14 which are linked to a master database 16 and kept current using a replicated database 18 by methods known to those of skill in the art. In one example, several clusters 14 are included, one for servicing each region of the telecommunication network where calling card service is available.

One example of a calling card system cluster 14 is the long distance calling card platform available from Inter-Voice Brite Corporation implemented in the SBC telecom network. The calling card system cluster 14 is coupled to the telecommunications network 10 and generates transaction records (CDRs) including transaction data corresponding to at least one telephone call placed by at least one subscriber 12. The cluster 14 generates transaction records in a manner that is known to those of skill in the art. The cluster 14, as described in more detail below, works with downstream processing systems to process the CDRs to provide billing statements or network usage reports for at least one of a plurality of subscribers or service providers. In the case of the calling card system cluster 14, the first analysis point for each transaction record downstream of the cluster 14 is a system known as the CDR service splitter 20. The splitter 20 divides the CDRs, typically by service provider or network vendor, and further forwards each record either directly, or through the cluster 14, to appropriate subsystems for further processing.

After the CDRs have been preprocessed by the splitter system 20, selected CDRs are retrieved from each cluster 14 by a production database server 22 by way of a streaming socket or other known communications link, and posted to a CDR table. Significant data from the CDR tables can be subsequently summarized and stored in a roll-up table within the production database server 22.

The production database server 22 is accessed by a production web server 24 which is a computer implemented system running application software to generate billing statements or reports regarding network usage corresponding to at least one telephone call. The reporting system application software resides on the production web server 24 and allows a user to access the information within the roll-up tables stored in the production database server 22. Access to the production web server 24 can be by way of a corporate intranet 26 in cooperation with a user access terminal 28 such as a personal computer. In this way, user access to the reporting system application software is made through the corporate intranet website, and compiled reports are queried and delivered from the production web server 24 to the user terminal 28 by way of the intranet 26. Of course, alternative access to the production database server and the corresponding CDR files could be implemented such as by a direct connection between the user terminal 28 and production database server 22 with the reporting system application software resided directly on the user terminal 28. Other locations for the reporting system application software are also contemplated by the present invention such as within the calling card system cluster 14, or CDR server splitter 20. In the example shown in FIG. 1, however, the CDRs generated by the calling card system cluster are processed off the cluster network 14 or splitter network 20 on a stand-alone system in the form of production database server 22 and production web server 24. Similarly, although access to production web server 24 is shown as being through intranet 26 by way of a user terminal 28, access could also be provided through a secure internet by methods known to those of skill in the art.

In operation, for each transaction on the telecommunications network 10, a record in the form of a call detail record is created. For each type of service provided by the telecommunications network 10, a separate processing system may exist. In this example, the service of concern is calling card services and the system which processes all calling card transactions is the duster 14 or multiple clusters 14. Cluster 14 may also process other enhanced network services such as Automated Attendant, or the enhanced network services may be processed by their own corresponding subsystem of the telecommunications network 10. In any event, for purposes of illustration herein, each calling card transaction on the telecommunications network 10 generates a CDR by cluster 14.

Each CDR generated by the cluster 14 may be defined as a data character string such as, for example, a 385 character line terminated by a line feed wherein different portions of the character string represent data associated with the call detail record. For example, characters 22 through 32 of the character string may represent a directory number inbound service number. Other portions of character string may indicate the billing number, the billable time, the automatic number identification, the rate class, the inbound and outbound trunk numbers, the date and time, and so on. The CDRs generated by the cluster 14 are periodically transmitted to the CDR server splitter 20 for storage and distribution. Similarly, the production database server 22 is periodically updated, such as hourly, with the CDRs generated by the cluster 14 and processed by the CDR server splitter 20.

The calling card CDRs are collected in real time from each of the calling card system clusters 14. This data is posted to the production database server 22 which retains a history of CDRs such as, for example 60 days of CDRs. The CDR roll-up table is periodically generated such as once a day. For example, the roll-up routine will read the previous day's usage from the production database server CDRs and accumulate specific significant data and store the same in the form of roll-up records. A roll-up table stores the roll-up records sorted by date and service provider.

Figure 2:
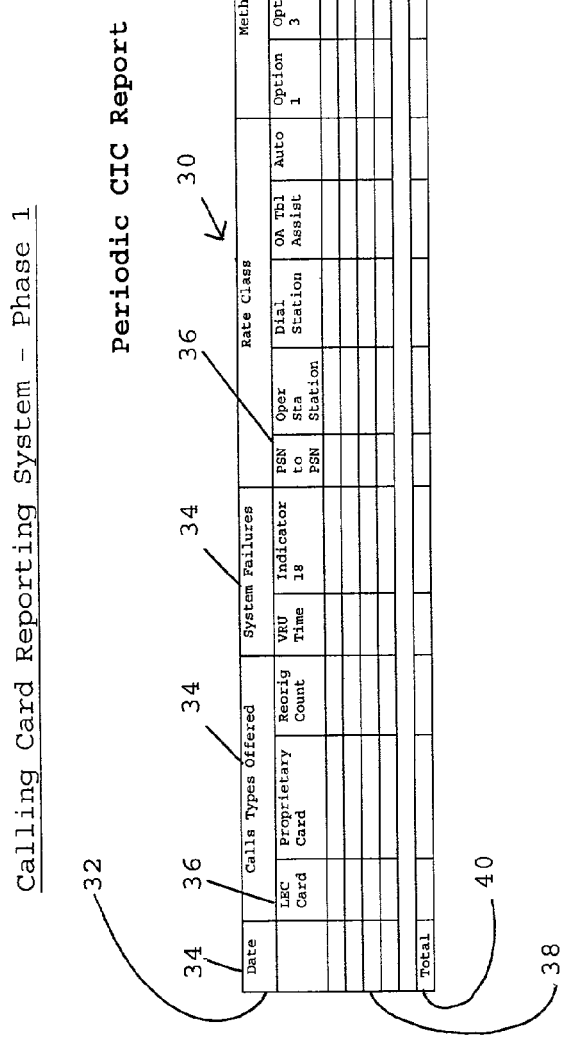
FIG. 2 is a schematic block diagram of a carrier identification code report generated by the reporting system of FIG. 1.

Referring now to FIG. 2 there is shown a schematic block diagram of a carrier identification code (CIC) report generated by the reporting system of FIG. 1. Each transaction record in the form of a CDR is represented by a number of fields containing information about a telephone call. Thus, an originating number field comprises a ten digit number identifying the calling party and a terminating number field comprises a ten digit number identifying the called party. A connect date field indicates the date that the transaction was made. A connect time field indicates the time of day the connection was made, and a duration field specifies the length of the call. A transaction identifier is also included to uniquely identify the CDR from all other CDRs processed by the system. From the 385 character data line representing an individual CDR, the CIC report of FIG. 2 is generated. The report 30 includes a header 32 having a plurality of fields 34 each of which may include one or more subfields 36. As an initial matter, the CIC reports 30 are associated with each particular carrier registered with the telecommunications network. Thus, the first grouping or sorting of CDRs generated by the cluster occurs at the carrier identification level. In this example, the CIC information is located in positions 187–190 and is four characters in length within the CDR. Having sorted the CDRs by the carrier identification code, each group of CDRs associated with a respective carrier is then compiled in the form of the report 30 of FIG. 2.

The report 30 is generated at the direction of the user at the user terminal 28 or it may be automatically periodically generated at the production web server 24 and stored. The type of report, the sorting fields, and the layout of the presentation can all be readily selected at the user terminal 28. In this way, the reporting functions of the present invention provide significant advantages and flexibility.

The fields 34 within the header 32 of the report 30 can include a Date field, Call Type Offered field, System Failure field, Rate Class field, Method of Recording field and Message Type field. The fields 34 and subfields 36 represented in record 30 may be advantageously compiled as part of the daily CDR roll-up procedure within the production database server 22 during retrieval and analysis of CDR records from each CDR cluster 14.

The Date field is used to sort the records by date for presentation within a periodic report such as, for example, a monthly, quarterly or yearly report. For the InterVoice Brite network cluster in the example of the present invention, the date information is located in positions 7–14 and is eight characters in length within the CDR.

The Call Types Offered field indicates the total daily counts for, in this case, all calling card calls. Several subgroups are identified within the Call Types Offered field for distinguishing between the various types of calling card transactions recorded by the system. Thus, it is indicated whether a Local Exchange Carrier (LEC) or Proprietary calling card had been used in originating the calling card call. The LEC and Proprietary card data is located in positions 199–200 and is two characters in length within the CDR. Reorigination or sequence count data is also recorded as a subgroup within the Call Types Offered field and is located in positions 262–263 and is two characters in length within the CDR. Reorigination/Sequence Calls are subsequent calls made during a single access to the platform. For example, when a subscriber places an initial call using standard procedures, once the call ends the subscriber has the option to generate a second call by pressing the # key on their phone. This eliminates the need for the caller to re-dial the 8XX access number to place a second call.

The Systems Failure field indicates the call time duration as well as incomplete call information. The time on the platform data is located in the Voice Response Unit (VRU) time data fields located at positions 246–251 and is six characters in length within the CDR. In one aspect of the invention, the data within the VRU time subfield is totaled and averaged for reporting purposes. The Incomplete Call information subfield is located within the indicator 18 field of the CDR at position 106 and is one character in length.

The Rate Class field maintains the types of call processed by the network. The Rate Class information is located in position 85 and is one character in length within the CDR. In the example of FIG. 2, five possible rate classes are shown and in one embodiment can be sorted according to each CIC and totaled for the date of interest. Two different subfields within a Rate Class are: Person-to-Person (PSN to PSN), Operator Station-to-Station, Dialed Station, Operator Assisted trouble assist, and Auto.

The Method of Recording field indicates the level of automation used and operator involvement for calls presented to the platform. The Method of Recording data is located in position 74–75 and is two characters in length. Advantageously, each column for the four possible methods of recording are sorted by CIC and totaled for the particular date(s) of interest. The four Methods of Recording are identified by option numbers within the two-character field wherein Option 1 represents a customer dialed station with no operator assistance, Option 3 represents a customer dialed transaction which was automatically dialed, Option 11 represents a customer dialed transaction with operator assistance, and Option 13 represents an operator completed transaction.

The Message Type field records the type of call processed by the cluster. The Message Type data is located in position 86 and is four characters in length within the CDR. The subfields associated with the Message Type fields are Sent Paid, Third Number Billing, Calling Card, or Collect Call. The Call Statistics field identifies any enhanced services which are used during the call transaction. Examples of subfields within the Call Statistics field are identified as Message Store and Forward (MSF), Directory Assistance (DA), and Conference Call (CFC). Additional enhanced services are also contemplated for reporting services by the present invention.

For each CIC, the periodic CIC report includes a plurality of CDR entries 38. The plurality of CDRs represented by the table or report 30 can advantageously be further processed such as, for example, by providing a Total of any one or more of the data fields 34 or subfields 36 represented in the report 30 such as shown in the footer Total 40. Averages, minimums and maximums may also be provided.

Figure 3:
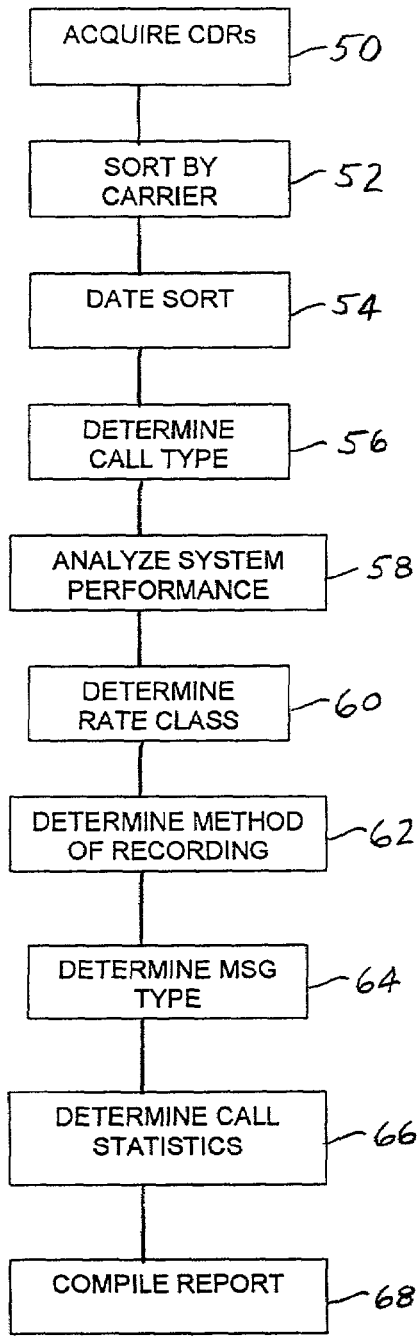
FIG. 3 is a logic flow diagram of one method of processing call detail records in accordance with the present invention.

Referring now to FIG. 3 there is shown a logic flow diagram of one method of processing call detail records in accordance with the present invention. The logic resides in the production web server 24 and is accessed through the intranet connection 26 by the user terminal 28. The method begins in step 50 by periodically acquiring CDRs from the calling card system cluster 14 (FIG. 1). For example, each day the CDRs generated by the cluster can be processed. In step 52, the CDRs are sorted by carrier identification code (CIC) such that carrier-specific reports can be generated. The CDRs associated with a particular carrier are then date sorted in step 54. In step 56, the Call Types Offered field is determined by querying the CDR data string as explained above with reference to FIG. 2. Similarly, in steps 58–66, the remaining fields 34 and subfields 36 of the periodic CIC report 30 of FIG. 2 are determined as explained above. Thus, the system performance and statistics are generated in step 58, the Rate Class is determined in step 60, the Method of Recording is determined in step 62, the Message Type is determined in step 64, and Call Statistics relating to enhanced services are determined in step 66.

Based upon the data fields analyzed for each CDR, a variety of reports can be generated in step 68. Thus, for example, the periodic CIC report 30 of FIG. 2 can be readily compiled in a format as shown which simply replicates the information within each of the determined fields and subfields. Several customized reporting functions are contemplated however by the present invention. These include a System Performance report, an Operator Assistance report and a Call Statistics report.

The System Performance report is a further refinement of the periodic CIC report 30 of FIG. 2 and includes only those fields relating to network performance statistics. Advantageously, the System Performance report includes the VRU Time subfield and Incomplete Message Store and Forward (MSF) which is represented by the Indicator 18 subfield. The System Performance report is intended to assist network operations and engineering personnel in understanding the daily activity occurring within each active calling card system cluster wherein the cluster represents a plurality of calling card network servers at a specific location, i.e., a city. The database servers associated with a calling card system cluster such as replicated database 18, master database 16 and production database server 22 of FIG. 1, can be remotely located from the calling card system cluster. In its simplest form, the System Performance report as identified above defines the daily statistics captured within each calling card cluster and presents them in a format understandable by a user interested in such statistics.

As a further example, an Operator Assistance report can be generated. This report groups and presents those subfields associated with operator activities for presentation to a user. Thus, the subfields identified as Operator Station-to-Station calls, Operator Trouble Assists, Operator Assisted Customer Dialing, and Operator Completed Dialing between parties data is represented in the Operator Assistance report. The Operator Assistance report can be advantageous in analysis and planning of staffing and customer service.

A Call Statistics report is also contemplated which includes all of the subfields within the Call Statistics field of the periodic CIC report. Thus, data regarding usage of enhanced services such as Message Store and Forward, Directory Assistance, and Conference Calling can be analyzed and reported. Advantageously, marketing personnel can utilize such a report to measure market penetration for enhanced services. Such marketing data can be sorted by CIC as well as geographically.

A Call Origination Report is also contemplated. The report analyzes the CDRs by originating state and country and further sorts the CDRs by CIC and date. In this way, statistical analysis of network usage can be conducted. The originating trunk report described below can provide the information of the Call Origination Report.

Figure 4:
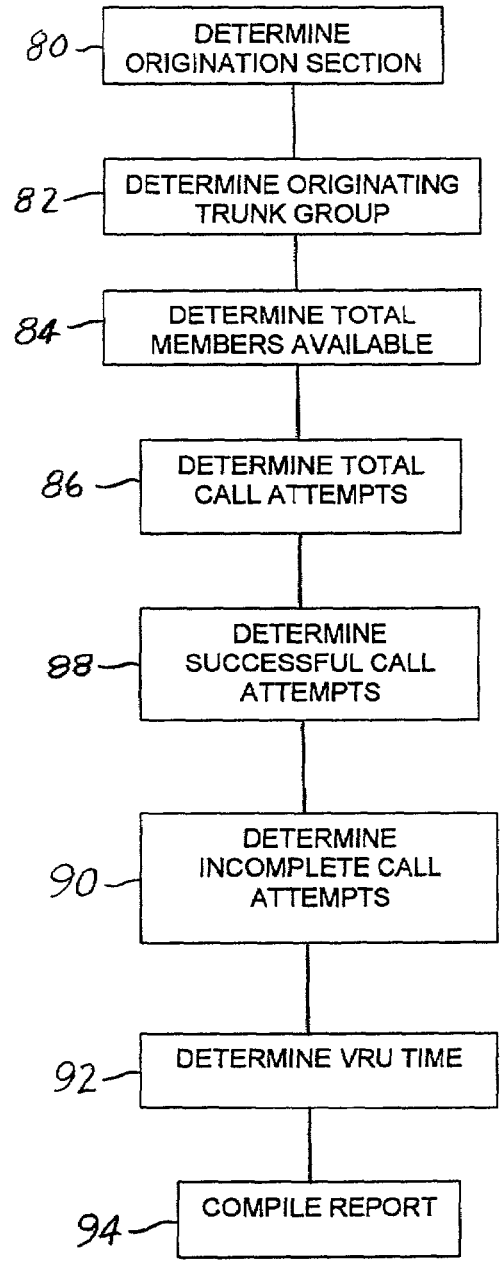
FIG. 4 is a logic flow diagram of another method of processing CDRs in accordance with the present invention.

Referring now to FIG. 4 there is shown a logic flow diagram of another method of generating a report from CDRs in accordance with the present invention. FIG. 4 describes one method of generating a trunk capacity report which displays, on a periodic basis, the total number of incoming and outgoing call attempts associated with each unique trunk group corresponding to the switching network. The data used to generate the trunk capacity report is again available from the calling card network CDRs generated by the calling card system clusters. Referring now to FIG. 4, in step 80 the logic routine determines the origination section or cluster. Identification of the individual clusters is accomplished by sorting the individual cluster identifications as defined in the calling card CDR character string. This data is located in CDR field 86 and is two characters in length. The cluster id's are defined to identify the physical location of each of the clusters within the system. Thus, for example, cluster identification number 01 may refer to the cluster located in Houston, whereas cluster identification number 02 may refer to the cluster located in Anaheim.

In step 82, the logic routine continues with identification of the Originating Trunk Group within a cluster by sorting the calling card CDRs using the originating trunk group number. This data is located in field 87 of the CDR character string and is three characters in length. Again, a look-up table of values can be indexed by the three character originating trunk group number to identify the switching network location associated therewith.

The logic routine continues in step 84 by determining the Total Members Available from each network switch origination point. This is accomplished by multiplying the total number of T-1 lines incoming to the switch by 24 to determine the total number of available members. The number of T-1s available at the switch can be determined from a look-up table of values indexed by the originating trunk group number as in step 82.

The logic routine then continues in step 86 to determine the Total Call Attempts again using the originating trunk group information from CDR field 87 as determined from step 82. To determine the total call attempts, the CDRs are first sorted by originating trunk number and then sorted using the look-up table (i.e. conversion chart) to sort the information according to originating switch. The total number of records received for the day within each group is then added to the specific cluster site to determine the total number of incoming (originating) call attempts from each network switch.

Once the number of Total Call Attempts has been determined, the number of Successful Call Attempts is determined in step 88. This is accomplished by sorting the information just gathered in the determination of the Total Call Attempts by the CDR data field 41 which corresponds to "Indicator 18" which is set if a call was incomplete. Thus, all CDR records that have a value of zero within this CDR field are considered successful and/or completed telephone calls. The total for all CDRs associated with each originating trunk group having a value of zero within this CDR field corresponds to the number of successful call attempts for the respective originating trunk group. The number of incomplete call attempts in step 90 is similarly determined by analysis of the "Indicator 18" field within the CDR character string. All CDR records having a value of, for example, two in the Indicator 18 field are considered an incomplete call. The total number of records having this value for each originating trunk group are then totaled to determine the total number of incomplete call attempts for the associated originating trunk group.

The VRU Time is next determined in step 92 by using the results from the Total Call Attempts calculation and totaling the time recorded within each CDR record field corresponding to VRU Time to determine the total number of VRU seconds for the associated originating trunk group. This total can either be recorded and/or the total VRU Time can be divided by the number of CDR records associated therewith in the total attempts calculation to determine the average VRU Time in seconds from each originating trunk group.

Similar steps can be performed for the termination section to generate a corresponding terminating trunk group report similar to the originating trunk group data determined in steps 82–92. Thus, the terminating trunk group is identified within a cluster by sorting the calling card CDRs using the terminating trunk group number located within field 89 of the CDR character string and being three characters in length. This identification number can then be cross-referenced with a look-up table of values indexed by the identification number to determine the corresponding terminating trunk number and switching network location. To determine the Total Members Available for the termination section, a similar calculation to that set forth with respect to step 84 is performed. The Total Call Attempts for the termination section uses the originating trunk group information and sorts the CDRs by originating trunk number. The originating trunk number is then used to identify the originating switch from the look-up table of values indexed by originating trunk number. The total number of records received for the day within each group to the specific cluster site is then added to determine the total number of incoming (originating) call attempts from each network switch. The CDR fields corresponding to "Record Type" as well as the CDR fields corresponding to "Rate Class" are then analyzed. If the Record Type field is something other than "01," it is totaled. Similarly, if the Rate Class field has a value of something other than "06," it is totaled. Values recorded in these fields are indicative of terminated calls. Thus, the two total counts derived from their respective fields is indicative of the actual terminating count total for each outgoing (terminating) call attempt to each network switch. The steps necessary to determine the number of Successful Call Attempts, Incomplete Call Attempts, and VRU Time (either average or total) are similar to those set for with respect to steps 88–92 above.

In step 94, the report is compiled periodically, such as daily, for each calling card system cluster. The report can advantageously be divided into originating trunk group information and terminated trunk group information based upon the foregoing method.

Referring now to FIG. 5 there is shown one example of a report generated in accordance with the method of FIG. 4. In FIG. 5, the report 100 relates to one of the plurality of clusters within the network. In this case, the Houston cluster is identified. Further, the report can be either compiled for the identified cluster on a daily, monthly, quarterly, yearly or other periodic basis. The report 100 is split into sections corresponding to the originating trunk group information 102 and terminated trunk group information 104 for the cluster of interest. Separate line items are generated for each originating and terminating switch connection to the respective cluster. The report of FIG. 5, and all reports generated by the system, can be displayed on the user terminal 28, saved in any of the servers, or printed.

The foregoing reporting method and enhanced services network system has several advantages. The reporting system and method has the ability to identify and sort call attempts made into the platform by customer CIC. All information corresponding to a particular CIC is available for sorting and displaying in a periodic format such as daily or monthly. Numerous individual statistics are also available such as the total number of local exchange carrier (LEC) calling card attempts on a periodic basis, the number of proprietary calling card attempts, the number of reorigination attempts, either LEC or proprietary, the number of invalid call attempts, as well as the use and/or market penetration of any enhanced service features such as Method Store and Forward, Directory Assistance or Conference Calling. The system also has the ability to identify by CIC, the number of calls transferred to operator assistance. Moreover, the user interface is advantageously implemented through a secure internet or intranet based server system. As a result of the flexibility and usability of the data analysis available from the system, the system can be used to advantage many users. Carriers have access to usage data and can be provided with customized billing records, marketing personnel can utilize the reports featured to measure market penetration of platform features and call origination volumes by carriers, network operations personnel can use the reporting features for auditing customer call flows, tracking platform hold time, and assisting with network maintenance, network engineering personnel can use the reporting features to determine actual call volumes versus forecasted call volumes and for managing equipment platform capacity, and the reporting features can also be used to staff telecommunications facilities based upon patterns of operator assistance. Numerous other reporting functions will present themselves to those of skill in the art in view of the foregoing disclosure and, indeed, are contemplated by the present invention.

From the foregoing, it can be seen that there has been brought to the art a new and improved system and method for processing call detail record files. Although the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A method of processing a plurality of call detail records (CDRs) each indicative of a call transaction on a telecommunications network, said method comprising the steps of:
   preliminarily processing said CDRs according to which telecommunications service providers supported the call transactions indicated in said CDRs;
   in response to a user request from a remote user terminal, receiving said plurality of CDRs at a first controller, each of said CDRs having a data structure including a plurality of fields containing at least one character;
   selecting a first sorting field from said plurality of fields and grouping said plurality of CDRs as a function of data within said first sorting field, said first sorting field being user selected as a carrier identification field;
   thereafter analyzing a user-selected second sorting field within each of said CDRs within a group of CDRs sorted by said first sorting field;
   generating a customized carrier-specific report for each of said grouped CDRs as a function of data within said user-selected second sorting field;
   delivering said customized carrier-specific report to said remote user terminal; and
   presenting said customized carrier-specific report to said user at said remote user terminal according to user-selected format preferepces, said customized carrier-specific report being selectively utile for monitoring network usage and making billing statements.

2. A method according to claim 1, wherein said plurality of CDRs are generated at a second controller coupled to said telecommunications network and located remote from said first controller.

3. A method according to claim 1, wherein at least one of said plurality of fields includes a plurality of subfields.

4. A method according to claim 1, wherein said call transaction is a long distance calling card transaction.

5. A method according to claim 1, wherein said user-selected second sorting field is an enhanced service identifier field including at least one subfield selected from the group consisting of a message store and forward subfield, a directory assistance subfield, and a conference calling subfield.

6. A method according to claim 1, wherein the step of receiving said plurality of CDRs at said first controller is executed periodically at daily, weekly, monthly, quarterly, or yearly intervals.

7. A method according to claim 1, said method further comprising the steps of:
   analyzing a user-selected third sorting field within each of said CDRs within a group of CDRs sorted by said first sorting field; and
   generating a customized report for each of said grouped CORs as a function of data within said user-selected second and third sorting fields.

8. A method according to claim 7, wherein the step of generating said customized report includes the step of determining and displaying a system variable as a function of data within at least one of said user-selected second and third sorting fields.

9. A method according to claim 8, wherein said user-selected second sorting field contains data indicative of Total Call Attempts, and said system variable corresponds to Successful Call Attempts.

10. A method according to claim 1, wherein said customized carrier-specific report includes transaction activity data and information for an originating trunk group and a terminating trunk group.

11. A call detail record (CDR) processing system for a telecommunications network, said system comprising:
  a system cluster in operative communication with said telecommunications network for generating a plurality of CDRs each indicative of a call transaction on said telecommunications network;
  a server-based splitter in operative communication with said system cluster for preliminarily processing said CDRs according to which telecommunications service providers supported the call transactions indicated in said CDRs;
  a production database server in operative communication with said system cluster for storing said CDRs as periodically received from at least one of said system cluster and said splitter;
  a user access server in operative communication with said production database server, said user access server programmed to (i) select a first sorting field from a plurality of fields within each CDR and group said plurality of CDRs as a function of data within said first sorting field, wherein said first sorting field is user selected as a carrier identification field, (ii) analyze a user-selected second sorting field within each of said CDRs within a group of CDRs sorted by said first sorting field, and (iii) generate a customized carrier-specific report for each of said grouped CDRs as a function of data within said user-selected second sorting field; and
  a user access terminal in operative communication with said user access server for presenting said customized carrier-specific report to a user according to user-selected format preferences, said customized carrier-specific report being selectively utile for monitoring network usage and making billing statements.

12. A system according to claim 11, wherein said system cluster comprises a plurality of servers.

13. A system according to claim 12, said system comprising at least one additional cluster located remote from said system cluster and in operative communication with said telecommunications network for generating CDRs indicative of call transactions on said telecommunications network.

14. A system according to claim 13, said system comprising a master database in operative communication with said system cluster and each said additional cluster for storing said CDRs generated by said system cluster and each said additional cluster.

15. A system according to claim 11, wherein said system cluster is a calling card system cluster for generating a CDR in response to each calling card transaction on said telecommunications network.

16. A system according to claim 11, wherein said CDR fields include at least one field selected from the group consisting of a Call Type Offered field, a System Failure field, a Rate Class field, a Method of Recording field, a Message Type field, and a Call Statistics field.

17. A system according to claim 16, wherein said Call Statistics field includes at least one subfield selected from the group consisting of a message store and forward subfield, a directory assistance subfield, and a conference calling subfield.

18. A system according to claim 16, wherein said Rate Class field includes at least one subfield selected from the group consisting of a person-to-person subfield, an operator station-to-station subfield, a dialed station subfield, and an operator assisted dialing subfield.

19. A system according to claim 16, wherein said Call Type Offered field includes at least one subfield selected from the group consisting of a local exchange carrier calling card subfield and a proprietary calling card subfield.

* * * * *